United States Patent Office 3,255,029
Patented June 7, 1966

3,255,029
MOLDING COMPOSITIONS
Robert Lionel Gorick, Preston, England (% Plastics & Resins Ltd., Higson Street Mill, Blackburn, Lancashire, England)
No Drawing. Filed July 27, 1962, Ser. No. 213,018
Claims priority, application Great Britain, Mar. 7, 1957, 7,562/57
6 Claims. (Cl. 106—290)

This application is a continuation-in-part of my copending application Serial No. 719,707, filed March 7, 1958, for Molding Compounds, and now abandoned.

This invention relates to molding compositions of the kind which simulate metal when set and which can be used without employing heat either to melt the composition or to effect setting.

Compounds of this general type are known but they do not readily adhere to metal, are subject to substantial shrinkage when setting and they are very brittle resembling ceramic materials in that respect.

The present invention provides a molding composition wherein the foregoing disadvantages are avoided or materially reduced whereby it may be used for the repair of dented or ruptured metal parts.

The composition of the invention contemplates the provision of liquid and dry components that are kept separate substantially until they are mixed at about the time of use.

The liquid component comprises essentially a suitable polyester resin containing an accelerator. When using rigid polyester, it will be necessary to include a plasticizer.

The dry component comprises metal in special particulate form and a catalyst, and it may be generally regarded as a filler for the polyester resin in the composition. If desired powdered mica and/or asbestos fibres may be incorporated into the dry component for dimensional stability.

Liquid Component

A preferred liquid polyester resin comprises by weight about 90% polyester of the type containing an inbuilt amine accelerator and about 10% plasticizer.

The polyester is preferably any unsaturated polyester formed by the reaction of a dicarboxylic acid with a dihydric alcohol, one or the other or both of which contains one or more carbon-to-carbon double bonds. The particular polyester may be selected according to the application, and may be the type of polyester known as isophthalic polyester containing inbuilt amine at the time of manufacture of the polyester. Furthermore, the polyesters known as bis-phenols may be used. However, although it is preferred that the polyester should have an inbuilt amine, this is not essential, and an amine may be added to the polyester at the time of preparing the liquid component.

The polyester preferably contains an accelerator and a suitable plasticizer.

The accelerator may be for example an amine type accelerator such as di-methyl para toluidine or di-methyl aniline, or a cobalt type accelerator such as cobalt octoate or cobalt naphthenate, either in proportions of 0.1% to 3.0% by weight of the polyester.

The plasticizer may for example be tricresyl phosphate, any suitable compatible polyester plasticizer, or a high molecular weight ester of phthalic acid, in suitable amounts up to about 50% by weight of the polyester.

The plasticizer and the accelerator may be mixed or blended into the already formed polyester. Alternatively, the polyester may contain an inbuilt amine accelerator introduced with the acid and alcohol during polyester formation.

Instead of adding the plasticizer to the polyester I may blend a relatively rigid polyester with sufficient internally plasticized, about 10% by weight polyester. For example the polyester may consist of about 85% rigid polyester combined with 15% plasticized polyester. Alternatively also, I may blend a rigid polyester with an inherently flexible isophathalic polyester in suitable proportions for desired hardness of the set composition.

Besides the polyester plasticizers already mentioned, all types of phosphate plasticizers and phthalate plasticizers may be used.

The preferred liquid component herein set forth as the preferred embodiment example for the invention is a liquid polyester resin and contains an accelerator in an amount of between 0.1% to 3.0% by weight and a suitable plasticizer which may be tricresyl phosphate in the amount of about 10% by weight of the polyester.

Dry component

The dry component or filler preferably contains essentially a uniform mixture of aluminum leaf and/or aluminum powder, a catalyst which is preferably benzoyl peroxide power, except where cobalt accelerators are used in the resin the catalyst may be cyclohexanone peroxide or other suitable peroxide to obtain the desired reaction when the components are mixed, and a wetting agent. The wetting agent should also serve as a damping agent for the aluminum powder or leaf, and also must not have a deleterious effect on the catalyst. Suitable wetting and damping agents are liquid paraffin and di-methyl phthalate. The damping effect is most important as otherwise aluminum leaf has an inherent tendency to float in the air when being blended with the liquid component.

Preferably I include wetting and damping agents in the proportion of about 2% to 10% by weight of the dry component, and this functions as a wetting agent for the metal surfaces when the components are mixed for use, and further as a plasticizer for the polyester in the mixture.

Also increased dimensional stability is attained by incorporating a suitable proportion of mineral filler, such for example as finely ground dolomite or talc.

Other metal powders such as iron, steel, brass, zinc or lead or mixtures of the same may replace the aluminum powder or part of it for some compositions.

The finely ground dolomite may be replaced in whole or in part by mica powder or asbestos fibre in some compositions.

The preferred dry component herein set forth as the preferred embodiment example for the invention is a mixture of the following:

78 parts aluminum leaf, 120 mesh
18 parts aluminum powder, 120 mesh
24 parts finely ground dolomite
18 parts benzoyl peroxide catalyst containing kaolin (marketed under the trade name of Lucidol).

The foregoing is mixed with 2%–10% by weight of liquid paraffin, and packaged ready for use.

Preferably these proportions may vary about 15% for various applications.

Formation of composition

When it is desired to use the composition, as to repair a dent in an automobile fender, the dry and liquid components which are packaged in separate containers are blended together substantially in situ in amounts of about one part powder to two parts liquid.

When the above described preferred liquid resin and dry filler components are brought together at the time of use a paste is formed which will set within an hour, and this time of setting can be varied by control of the quantity of catalyst used. A larger amount of catalyst speeds the setting time. In this paste form the composition is easy to apply since it has good adhesion to metal, will spread easily and retains a given shape very well. There is substantially no shrinkage or expansion during setting.

While I refer to the dry component as filler it has been observed that the herein described composition consisting of the mixed liquid resin and dry components specially combines to form a highly desirable new plastic molding composition structure in a unique manner. During this mixing action the granular aluminum and the dolomite function as spacers for the aluminum leaf. This prevents agglomeration of the aluminum leaf structure, and aids easy spreading of the composition. Also it helps to restrict the entrainment of air during mixing. Furthermore, the liquid or equivalent wetting and damping agent has proven to be an essential practical component for preventing flotation of the aluminum leaf during the mixing of the components. It greatly improves the incorporation of the aluminum leaf into the polyester by cutting down the surface tension.

When the mixture has set or cured in situ it is hard and may be machined or otherwise mechanically worked. The leafing properties of the incorporated aluminum leaf reinforces the polyester resin with a plate-like or laminar structure, and by virtue of this structure wherein the essentially resilient polyester resin is intensely divided by the spaced soft aluminum slivers or leafs with powder spacing, the cured mass is easier to cut, file or the like.

The invention may be embodied in other specific forms without departing from the spirit or essential characteristics therefor. The present embodiments are therefore to be considered in al respects as illustrative and not restrictive, the scope of the invention being indicated by the appended claims rather than by the foregoing description, and all changes which come within the meaning and range or equivalency of the claims are therefore intended to be embraced therein.

What is claimed and desired to be secured by Letters Patent is:

1. A dry filler component adapted to be used with a liquid component containing a polyester resin and an accelerator to form a simulated metal molding compound, consisting essentially of a substantially uniform mixture of:

(a) metallic leaf in particulate form, said metallic leaf being non-reactive with the liquid component and the other ingredients of the dry component;

(b) about 2–10% by weight of the dry component of a material selected from the group consisting of liquid paraffin and dimethyl phthalate; and (c) a catalyst selected from the group consisting of benzoyl peroxide and cyclohexanone peroxide.

2. The filler component as defined in claim 1, wherein said mixture further includes a powdered metallic material which is non-reactive with the liquid component and the other components of the dry component.

3. The filler component as defined in claim 2, wherein the powdered metallic material is at least one of the group consisting of aluminum, iron, steel, brass, zinc, and lead.

4. The filler component as defined in claim 1, wherein said mixture further includes a mineral filler for increasing the dimensional stability of the molding composition.

5. The filler component as defined in claim 4, wherein the mineral filler is at least one of the group consisting of finely ground dolomite, finely ground talc, mica powder, and asbestos fibre.

6. The filler component as defined in claim 1, wherein the metallic leaf is essentially particulate aluminum.

References Cited by the Examiner

UNITED STATES PATENTS

| | | | |
|---|---|---|---|
| 2,523,625 | 9/1950 | Jones et al. | 260—40 X |
| 2,758,983 | 8/1956 | Toulmin | 260—40 |
| 2,901,455 | 8/1959 | Jurras | 260—40 |
| 2,937,153 | 5/1960 | Rasmussen et al. | 260—40 X |

OTHER REFERENCES

Bjorksten: "Polyesters and Their Applications," Reinhold Corp., N. Y., 1956 (pages 73 and 187 cited).

The Condensed Chemical Dictionary, Sixth Ed. Reinhold Pub. Corp., N. Y., 1961, pages 398, 870 and 871.

TOBIAS E. LEVOW, Primary Examiner.

MORRIS LIEBMAN, Examiner.

A. KOECKERT, J. POER, Assistant Examiners.